(12) United States Patent
Warren et al.

(10) Patent No.: US 7,761,782 B1
(45) Date of Patent: Jul. 20, 2010

(54) USER PROGRAMMABLE DEDUCTIVE SPREADSHEET APPARATUS WHICH SUPPORTS SOLUTIONS TO CIRCULAR DEFINITIONS

(75) Inventors: David S. Warren, Stony Brook, NY (US); Iyer Venkat Ramakrishnan, Setauket, NY (US); Coimbatore Rajamani Ramakrishnan, Mount Sinai, NY (US)

(73) Assignee: XSB, Inc., Stony Brook, NY (US)

( * ) Notice: Subject to any disclaimer, the term of this patent is extended or adjusted under 35 U.S.C. 154(b) by 1231 days.

(21) Appl. No.: 11/257,923

(22) Filed: Oct. 25, 2005

Related U.S. Application Data (60) Provisional application No. 60/622,154, filed on Oct. 26, 2004.

(51) Int. Cl.
*G06F 17/00* (2006.01)
(52) U.S. Cl. .................. 715/212; 715/213; 715/219; 715/220
(58) Field of Classification Search ......... 715/212–213, 715/219–220
See application file for complete search history.

(56) References Cited

U.S. PATENT DOCUMENTS

| 5,550,964 A | * | 8/1996 | Davoust ............. 345/440 |
| 2002/0055954 A1 | * | 5/2002 | Breuer ............. 707/507 |
| 2003/0009649 A1 | * | 1/2003 | Martin et al. ............. 712/1 |
| 2003/0093351 A1 | * | 5/2003 | Sarabanchong ............. 705/36 |
| 2006/0048044 A1 | * | 3/2006 | Genesereth et al. ......... 715/503 |

OTHER PUBLICATIONS

Microsoft Excel 2003 Printout (herein Excel), copyright 2003, pp. 1-2.*
Chen, et al., Tabled Evaluation with Delaying for General Logic Programs, J. of the ACM, Jan. 1999.
Chimenti, et al., The LDL System Prototype, MCT Corp., Nov. 9, 1999.
Gelfond, et al., The Stable Model Semantics for Logic Programming, Proc. of the 5th Int.l Conference on Logic Programming, 1988.
Gupta, et al., Knowledgesheet: A Graphical Spreadsheet Interface . . . , Lecture Notes, 2000.
Gupta, et al., Maintaining Views Incrementally, SIGMOD, 1993.
Hermenegildo, et al., Using Global Analysis, Partial Specifications, and an Extensible Assertion Language for Program Validation and Debugging, Technical University of Madrid, Jul. 1999.

(Continued)

*Primary Examiner*—Thu Huynh
(74) *Attorney, Agent, or Firm*—Thomas A. Gallagher (57) ABSTRACT

A user programmable deductive spreadsheet is implemented as an add-in to an existing mathematical spreadsheet program and allows the use of a logic programming language such as Prolog via a familiar spreadsheet interface. A syntax is provided whereby a set of multiple values can be stored in a cell and can be operated on recursively by an expression in another cell. Rows and columns can be given user defined names and cells can be referenced by row and column name. Cells can reference cells in other spreadsheets or can reference an entire spreadsheet in one cell. A cell expression can reference itself. Logical, arithmetic, and lifted operators are provided. Spreadsheets can be defined as a transformation of another spreadsheet. When no negative or aggregate operators are used in the cell expressions, the meaning of the spreadsheet is given in terms of least fixed points. Otherwise, the meaning is given in terms of perfect models.

19 Claims, 8 Drawing Sheets

OTHER PUBLICATIONS

Jaffar, et al., Constraint Logic Programming: A Survey, Journal of Logic Programming, 1994.

Jayaraman, et al., Subset Logic Programs and their Implementation, J. Logic Programming, 1994.

Jones, et al., A User-Centered Approach to Functions in Excel, ICFP'03, Aug. 2003.

Kassoff, et al., PrediCalc: A Logical Spreadsheet Management System, Proc. of the 31st VLDB Conf., 2005.

Kifer, et al., Logical Foundations of Object-Oriented and Frame-Based Languages, ACM, Inc., 1995.

Kutchenhoff, On the Efficient Computation of the Difference BetweenConsecutive Database States, In Proc. 2d Int. Conf. Deductive and Object Oriented Databases, 1991.

Mallet, et al., Generating Deductive Database Explanations, Proc. of the 1999 Int. Conf. on Logic Programming, 1999.

Mayol, et al., A Survey of Current Methods for Integrity Constraint Maintenance and View Updating, ER Workshops, 1999.

Pemmasani, et al., Online Justification of Tabled Logic Programs, Proc. of the Int. Symp. on Functional and Logic Programming, Apr. 2004.

Przymusinski, Perfect Model Semantics, Proc. of the 5th Int. Conf. and Symp. on Logic Programming, 1988.

Ramakrishna et, al., Efficient Model Checking Using Tabled Resolution, CAV, 1997.

Ramakrishnan, et al., CORAL-Control, Relations and Logic, Proc. of the 18th VLDB Conf., 1992.

Ramakrishnan, et al., XMC: A Logic-Programming-Based Verification Toolset, CAV, 2000.

Roychoudhury, et al., Justifying Proofs using Memo Tables, PPDP'00, 2000.

Sagonas, et al., XSB as an Efficient Deductive Database Engine, SIGMOD, 1994.

Saha, et al., Incremental and Demand-driven Points-To Analysis Using Logic Programming, PDP'05, Jul. 2005.

Saha, et al., Incremental Evaluation of Tabled Logic Programs, Int. Conf. on Logic Programming, 2003.

Schrijvers, et al., Constraint Handling Rules and Tabled Execution, 2004.

Tamaki, et al., OLD Resolution with Tabulation, Int. Conf. on Logic Programming, 1986.

Van Gelder, et al., The Well-Founded Semantics for General Logic Programs, ACM, 1991.

Yang, et al., FLORA: Implementing an Efficient DOOD System Using a Tabling Logic Engine, 6th Int. Conf. on Rules and Objects in Databases, 2000.

* cited by examiner

|   | A | B | C |
|---|---|---|---|
| 1 |   | PREF | PROVIDER |
| 2 | ARBN | [ORDCO, RORPR] |   |
| 3 | FSB | [ORDCO, RORPR] |   |
| 4 | MSB |   | [ORDCO, RORPR] |

B3  ▼  *fx* =DSS("PROVIDER MSB")

Figure 5

|   | A | B | C |
|---|---|---|---|
| 1 |   | PREF | PROVIDER |
| 2 | ARBN | [ORDCO, RORPR] |   |
| 3 | FSB | [ORDCO, RORPR] |   |
| 4 | MSB |   | [ORDCO, RORPR] |
| 5 |   |   |   |

B2  ▼  *fx* =DSS("PREF FSB")

|   | B3 | ▼ | $f_x$ =DSS("a,d") |   |
|---|---|---|---|---|
|   | A | B | C | D |
| 1 |   | edge | reach |   |
| 2 | a | [b] | [a, b, d] |   |
| 3 | b | [a, d] | [a, b, d] |   |
| 4 | c | [a] | [a, b, d] |   |
| 5 | d | [a] | [a, b, d] |   |

*Figure 8*

|   | C3 | ▼ | $f_x$ =DSS("edge b, reach edge b") |   |   |   |
|---|---|---|---|---|---|---|
|   | A | B | C | D | E | F |
| 1 |   | edge | reach |   |   |   |
| 2 | a | b | [a, b, d] |   |   |   |
| 3 | b | [a, d] | [a, b, d] |   |   |   |
| 4 | c | a | [a, b, d] |   |   |   |
| 5 | d | a | [a, b, d] |   |   |   |
| 6 |   |   |   |   |   |   |

| | =DSS("(acme, ((_acq_acmeswitch!(buy acme))|(_acq_acmeswitch!(build acme))))" |

| | A | B | C | D | E | F | G |
|---|---|---|---|---|---|---|---|
| 1 | | buy | get_comp | build | total_cost | | |
| 2 | gyro | [] | [45] | [] | [] | | |
| 3 | precision | [] | [44] | [57] | [(precision, 57)] | | |
| 4 | acme | [] | [44] | [] | [] | | |
| 5 | dunrite | [58] | [46] | [] | [(dunrite, 58)] | | |
| 6 | allied | [] | [46] | [57] | [(allied, 57)] | | |
| 7 | | | | | | | |

\_acq\_acmeswitch / subpart_of / supply_costs / ship / assembly_costs

Figure 12

| | =DSS("(((assembly_costs!(switch_assm gyro))+(_acq_acmeswitch!(get_comp gyro)))+(ship!(gyro acme)))") |

| | A | B | C | D | E | F |
|---|---|---|---|---|---|---|
| 1 | | buy | get_comp | build | total_cost | |
| 2 | gyro | [] | 45 | [] | [] | |
| 3 | precision | | | | | |
| 4 | acme | | | | | |
| 5 | dunrite | | | | | |
| 6 | allied | | | | | |

\_acq\_acmeswitch / subpart_of / supply_costs / ship / assembly_costs

Figure 13 fx =DSS("((supply_costs!(switch_assm gyro))+(ship!(gyro acme)))")

|   | A | B | C | D | E | F |
|---|---|---|---|---|---|---|
| 1 |   | buy | get_comp | build | total_cost |   |
| 2 | gyro | [] | 45 | [] | [] |   |
| 3 | precision |   |   |   |   |   |
| 4 | acme |   |   |   |   |   |
| 5 | dunrite |   |   |   |   |   |
| 6 | allied |   |   |   |   |   |

\_acq_acmeswitch / subpart_of / supply_costs / ship / assembly_costs /

*Figure 14* fx =DSS("((supply_costs!(switch_assm dunrite))+(ship!(dunrite acme)))")

|   | A | B | C | D | E | F |
|---|---|---|---|---|---|---|
| 1 |   | buy | get_comp | build | total_cost |   |
| 2 | gyro | [] | 45 | [] | [] |   |
| 3 | precision | [] |   |   |   |   |
| 4 | acme | [] |   |   |   |   |
| 5 | dunrite | 58 |   |   |   |   |
| 6 | allied | [] |   |   |   |   |

\_acq_acmeswitch / subpart_of / supply_costs / ship / assembly_costs /

*Figure 15*

| | A | B | C | D | E | F |
|---|---|---|---|---|---|---|
| | | buy | get_comp | build | total_cost | |
| 1 | | | | | | |
| 2 | gyro | [] | [45] | [] | [] | |
| 3 | precision | [] | [44] | [57] | [(precision, 57)] | |
| 4 | acme | [] | [44] | [] | [] | |
| 5 | dunrite | [58] | [46] | [] | [(dunrite, 58)] | |
| 6 | allied | [] | [46] | [57] | [(allied, 57)] | |

=DSS("(gyro, ((_acq_acmeswitch!(buy gyro))|(_acq_acmeswitch!(build gyro))))")

\_acq_acmeswitch / subpart_of / supply_costs / ship / assembly_costs

*Figure 16*

=DSS("min(2,exists(v_1,(v_1, (((supply_costs!(switch_assm v_1))+(ship!(v_1 acme)))|((assembly_costs!(switch_assm v_1))+SUM(2,(acquire!(((subpart_of!(part_of switch_assm)) v_1))+(ship!(v_1 acme))))))))")

| | A | B | C | D | E | F |
|---|---|---|---|---|---|---|
| 1 | | limit_switch | switch_assm | actuator | sensor | transmitter |
| 2 | gyro | | | | | |
| 3 | precision | | | | | |
| 4 | acme | | [(dunrite, 58)] | | | |
| 5 | dunrite | | | | | |
| 6 | allied | | | | | | acquire / acq_acmeswitch / subpart_of / supply_costs / ship / assembly_costs

*Figure 17*

| | A | B | C | D | E | F |
|---|---|---|---|---|---|---|
| 1 | | limit_switch | switch_assm | actuator | sensor | transmitter |
| 2 | gyro | | | | | |
| 3 | precision | | | | | |
| 4 | acme | | [(dunrite, 58)] | | | |
| 5 | dunrite | | | | | |
| 6 | allied | | | | | | acquire / _acq_acmeswitch / subpart_of / supply_costs / ship / assembly_costs

USER PROGRAMMABLE DEDUCTIVE SPREADSHEET APPARATUS WHICH SUPPORTS SOLUTIONS TO CIRCULAR DEFINITIONS

CROSS-REFERENCE TO RELATED APPLICATIONS

This application claims benefits from U.S. Provisional Patent Application No. 60/622,154, filed Oct. 26, 2004, the contents of which are hereby incorporated herein by reference.

STATEMENT REGARDING FEDERALLY SPONSORED RESEARCH OR DEVELOPMENT

The Federal Government has certain rights in this invention as provided for by Defense Advanced Research Projects Agency (DARPA) Order S016-51 and U.S. Army Aviation and Missile Command Contract No. W31P4Q-05-C-R034.

COPYRIGHT NOTICE

A portion of the disclosure of this patent document contains material which is subject to copyright protection. The copyright owner has no objection to the facsimile reproduction by one of the patent disclosure, as it appears in the Patent and Trademark Office patent files or records, but otherwise reserves all copyright rights whatsoever.

BACKGROUND OF THE INVENTION

1. Field of the Invention

This invention relates broadly to deductive spreadsheets. More particularly, this invention relates to a user programmable deductive spreadsheet that supports recursive definitions.

2. State of the Art

Deductive spreadsheets are the subject of DARPA Topic Number SB043-040. Generally, a deductive spreadsheet is a computer program which allows logic programming via a familiar spreadsheet user interface. Traditional spreadsheet programs allow an end user to "program" a spreadsheet to perform elaborate and complex mathematical computations using a very high level intuitive interface which is relatively easy to learn compared to a lower level computer programming language. The first computer spreadsheet program was introduced in 1979 and since then spreadsheet programs have become an indispensable and familiar part of many businesses.

Logic programming, also known as mechanical deduction and machine-assisted reasoning is the key component of many intelligent computing applications. Intelligent computing applications include applications such as robotics, expert systems, financial planning, decision support and logistics. Typically, in these types of applications, knowledge of the application domain is encoded within a knowledge base and an inference engine makes decisions and/or answers questions based on the contents of the knowledge base. There are several specialized logic programming languages because logic programming with a general purpose programming language is extremely complex. One of the most widely used logic programming languages is Prolog.

A Prolog program consists of a database of facts and rules denoting logical relationships that relate to the given application. Specifically facts and rules are expressed using the syntax "head:-body.", where head is a literal and body is a conjunct of literals. The head is true whenever the body is true. A head with an empty body is a fact and is unconditionally true. Rather than running a Prolog program to obtain a solution, the user asks a question. When asked a question, the Prolog run time system searches through the database of facts and rules to determine (by logical deduction) the answer.

Prolog programs are declarative. Rules are used to express relationships between entities, and these rules are used to find solutions to queries using a theorem-proving approach, namely resolution. Because logic programming languages are inherently "high-level", i.e. they focus on the computation's logic and not on its mechanics, programmers can focus on expressing complex ideas without worrying about low-level details of memory management, stack pointers, etc. Nevertheless, one still has to be well versed in the language in order to program the problem. Indeed programming problems requiring non-trivial and elaborate reasoning are beyond the capabilities of end users who are not trained as programmers.

Deductive spreadsheets attempt to meet the need of end users who desire to create relatively complex logic programs to meet their specific needs. It is well recognized that end user programmers outnumber professional programmers and this trend is projected to grow. A recent study released by Carnegie Mellon University School of Computer Science estimates that in 2012, there will be 90 million end-user programmers in American workplaces. Of these, over 55 million will use spreadsheets or databases According to DARPA Topic SB043-040, it is expected that "the spreadsheet approach should make authoring, maintaining and using a rule-base easier. We do expect a 'deductive spreadsheet' may require additional training over a trivial spreadsheet. We would expect the users to be military staff officers, engineers and scientists (such as biologists) constructing and using theories/models of the battlefield situation, courses of action and scientific phenomena."

Gopal Gupta and S. F. Akhter, "Knowledgesheet: A graphical spreadsheet interface for interactively developing a class of constraint programs", Proc. of Practical Aspects of Declarative Languages, LNCS Vol. 1753, 2000 and M. Kasoff, L. M. Zen, A. Garg and M. Genesereth, "PrediCalc: A logical spreadsheet management system", 31st Intl. Conf. on Very Large Databases, 2005 both disclose extensions to traditional spreadsheets which allow the user to specify constraints on the values of cells. Cells are still required to contain single values, but those values may be partially (or totally) determined by constraints. Constraints may be arithmetic, Boolean, etc.

In Knowledgesheet, finite-domain constraints are associated with cells and specify combinatorial problems. Upon user request, the system converts these constraints into a CLP(FD) program, executes it, and returns the solution as cell values. Those skilled in the art will appreciate that CLP(FD) means constraint logic programming (finite domain).

In PrediCalc, the constraint-solving engine is more integrated into spreadsheet interaction, and issues addressed include how to handle over-specified (or inconsistent) values and under-specified values. However, neither Knowledgesheet nor PrediCalc supports full deduction. In particular they do not support recursive definitions.

SUMMARY OF THE INVENTION

It is therefore an object of the invention to provide a user programmable deductive spreadsheet.

It is another object of the invention to provide a user programmable deductive spreadsheet which supports recursive definitions.

It is a further object of the invention to provide a user programmable deductive spreadsheet in which a spreadsheet cell can contain a set of values.

It is also an object of the invention to provide a user programmable deductive spreadsheet which implements Prolog facts and rules statements.

It is an additional object of the invention to provide a user programmable deductive spreadsheet wherein the body of a Prolog rule contained in one cell can reference another cell containing a set of elements.

It is still another object of the invention to provide a user programmable deductive spreadsheet in which one cell can contain an operator which performs a function over a set of values contained in another cell.

It is another object of the invention to provide a user programmable deductive spreadsheet in which a first cell can contain an expression which references a second cell and the second cell references the first cell directly or indirectly.

It is a further object of the invention to provide a user programmable deductive spreadsheet in which a cell can contain an expression which references a group of cells in the same spreadsheet or in a different spreadsheet.

It is also an object of the invention to provide a user programmable deductive spreadsheet which generates and displays explanations or justifications why a cell contains the elements that appear in the cell.

In accord with these objects, which will be discussed in detail below, a deductive spreadsheet according to the invention is implemented as an "add-in" to an existing spreadsheet program. In an exemplary embodiment, the invention is implemented as an add-in to Microsoft Excel and is written in C and Prolog. The add-in is accessed as a user defined function "=DSS" or by using the operators "[ ]". An important feature of the invention is that multiple facts can be entered in a single spreadsheet cell. Another important feature is the ability to create a Prolog rule by referencing another cell. In order to make the interface intuitive, references to cells can take the form "sheet!(row name.column name)". This form of reference allows cells in one spread sheet to reference cells in another spreadsheet. Moreover, this form of reference provides the names of rows and columns with semantic significance. Thus, the end user can see the logic of an expression without having to refer back to unintuitive cell reference e.g. cell C3. According to the invention cells can be referenced with the syntax "rowname.columnname" or "columnname rowname".

The simple mechanisms of multi-valued cells and cells that contain expressions referencing other cells provide an extremely powerful deductive system. Recursive definitions are introduced through cyclic cell references, i.e., when a cell expression references another cell that references it. The natural meaning of recursive definitions is given through least fixed points. The cells contain the smallest sets that satisfy all the set constraints specified by the explicit cell contents and the implicit cell contents expressed by cell references. The fixed point is reached by starting with each cell containing just its explicit values, and then iteratively adding the values as specified by the indicated operators to the current contents of the referenced cells. This continues until no new values can be added to any cell, i.e., until a fixed point is reached.

According to another aspect of the invention, data from one spreadsheet can be transformed and added to other data to create a new spreadsheet which conveys additional information. Also data and rules can be altered to create "what if" studies.

According to another aspect of the invention, inference justification is provided to support logical conclusions. This is shown by highlighting cells that immediately lead to the conclusion. Justification shows the user only those parts of the proof search that are relevant to the proof/disproof of the goal. For example, if a query is evaluated to true, the justifier will present the details of a successful computation path, completely ignoring any unsuccessful paths traversed. Similarly, when a query is evaluated to false, it will only show a false literal in each of its computation paths, completely ignoring the true literals.

In a complex model, multiple related spreadsheets which reference each other are created and the invention provides different ways to view multiple related sheets. In addition to the familiar tiling of windows, the invention allows two windows to be scrolled together and also allows tables to be overlaid on one another. In overlaying one or more sheets having the same row and column names, cells grow subcells, each showing the contents of the cell of a respective sheet at the particular row and column intersection. Each subcell is also labeled with the name of the sheet it is displaying. Overlay view can be exited by clicking on a subcell and the view will change to a view of the sheet that contains the subcell.

Additional objects and advantages of the invention will become apparent to those skilled in the art upon reference to the detailed description taken in conjunction with the provided figures.

BRIEF DESCRIPTION OF THE DRAWINGS

FIG. 3 is a high level schematic diagram of how the invention is implemented as an EXCEL add-in;

BRIEF DESCRIPTION OF THE APPENDIX

The attached CDROM appendix, which is incorporated herein by reference, includes source code for implementing an example of the invention. The CDROM is in ISO 9660 format and contains the following files:

| Size | Date | File Name |
| --- | --- | --- |
| 7.5K | May 25 2005 | DssAddin/Automation.cpp |
| 364 | May 25 2005 | DssAddin/DssAddin.clw |
| 2.9K | May 25 2005 | DssAddin/DssAddin.cpp |
| 472 | May 25 2005 | DssAddin/DssAddin.def |
| 214 | Jan. 21 2005 | DssAddin/DssAddin.dep |
| 5.1K | May 25 2005 | DssAddin/DssAddin.dsp |
| 510 | May 25 2005 | DssAddin/DssAddin.dsw |
| 1.8K | May 25 2005 | DssAddin/DssAddin.h |
| 8.1K | Apr. 8 2005 | DssAddin/DssAddin.mak |
| 129K | May 25 2005 | DssAddin/DssAddin.ncb |
| 46K | May 25 2005 | DssAddin/DSSAddin.opt |
| 14K | May 25 2005 | DssAddin/DssXII.cpp |
| 25K | May 25 2005 | DssAddin/EventProxy.cpp |

-continued

| Size | Date | File Name |
|---|---|---|
| 2.7K | May 25 2005 | DssAddin/EventProxy.h |
| 18K | May 25 2005 | DssAddin/ExcelCallbacks.cpp |
| 4.5K | May 25 2005 | DssAddin/ExcelCallbacks.h |
| 19K | May 25 2005 | DssAddin/FRAMEWRK.cpp |
| 1.4K | Jan. 25 2005 | DssAddin/FRAMEWRK.H |
| 5.0K | May 25 2005 | DssAddin/functions.cpp |
| 16K | May 25 2005 | DssAddin/PrologInterface.cpp |
| 1.5K | May 25 2005 | DssAddin/PrologInterface.h |
| 4.7K | May 25 2005 | DssAddin/PXICallback.cpp |
| 4.9K | May 25 2005 | DssAddin/PXICallback.h |
| 2.7K | Jan. 21 2005 | DssAddin/ReadMe.txt |
| 387 | May 25 2005 | DssAddin/res/DssAddin.rc2 |
| 364 | May 25 2005 | DssAddin/Resource.h |
| 202 | May 25 2005 | DssAddin/StdAfx.cpp |
| 1.4K | May 25 2005 | DssAddin/StdAfx.h |
| 17K | May 25 2005 | DssAddin/Utils.cpp |
| 6.6K | May 25 2005 | DssAddin/Utils.h |
| 29K | Jan. 25 2005 | DssAddin/XLCALL.H |
| 3.4K | Jan. 21 2005 | DssAddin/XLCALL32.LIB |
| 12K | Mar. 18 2005 | DSSAddinCallback/DSSAddinCallback.cpp |
| 408 | Mar. 17 2005 | DSSAddinCallback/DSSAddinCallback.H |
| 1.7K | Mar. 17 2005 | DSSAddinCallback/MakefileForCreatingDLLs |
| 295 | Jan. 25 2005 | DSSAddinCallback/StdAfx.cpp |
| 778 | Jan. 25 2005 | DSSAddinCallback/StdAfx.h |
| 14K | Feb. 14 2005 | examples/Book1.xls |
| 6 | Feb. 14 2005 | examples/Book2.xls |
| 14K | Feb. 14 2005 | examples/TransitiveClosure.xls |
| 6.1K | Jan. 10 2005 | ExcelAddin/BttnHandler.cpp |
| 7.9K | Jan. 10 2005 | ExcelAddin/ComAddin.cpp |
| 8.1K | Jan. 14 2005 | ExcelAddin/ComAddin.h |
| 11K | Jan. 10 2005 | ExcelAddin/DispatchEvents.cpp |
| 24K | Jan. 14 2005 | ExcelAddin/EventProxy.cpp |
| 201 | Jan. 10 2005 | ExcelAddin/ExcelAddin.def |
| 4.7K | Jan. 10 2005 | ExcelAddin/ExcelAddin.dsp |
| 514 | Jan. 10 2005 | ExcelAddin/ExcelAddin.dsw |
| 5.4K | Jan. 10 2005 | ExcelAddin/ExcelAddin.mak |
| 527 | Jan. 10 2005 | ExcelAddin/ExcelPrologProxy.h |
| 2.5K | Jan. 10 2005 | ExcelAddin/jni_call.cpp |
| 12K | Jan. 14 2005 | ExcelAddin/MyAddin.cpp |
| 2.2K | Jan. 10 2005 | ExcelAddin/MyAddinCF.cpp |
| 13K | Jan. 18 2005 | ExcelCallback/ExcelCallback.cpp |
| 90 | Jan. 18 2005 | ExcelCallback/ExcelCallback.H |
| 1.5K | Jan. 17 2005 | ExcelCallback/MakefileForCreatingDLLs |
| 292 | Jan. 17 2005 | ExcelCallback/StdAfx.cpp |
| 747 | Jan. 17 2005 | ExcelCallback/StdAfx.h |
| 17K | Jul. 18 2005 | prolog/dss_cell_synsem.P |
| 3.8K | May 25 2005 | prolog/dss_scanner.P |
| 21K | Jul. 18 2005 | prolog/excel_handler.P |
| 3.5K | Jan. 26 2005 | README.txt |

DETAILED DESCRIPTION

Details of the deductive spreadsheet according to the invention will be explained with reference to several examples which solve different problems. The first example is a simple logistics problem.

TABLE 1

| Supplier | Product |
|---|---|
| ORDCO | Subsistence, Ammunition, Fuel |
| RORPR | Ammunition |
| 3Party | Subsistence |

Table 1 illustrates three suppliers and the class of products they supply. ORDCO supplies subsistence, ammunition, and fuel. RORPR supplies only ammunition and 3Party provides only subsistence. The concept illustrated by Table 1 is that an individual cell in a deductive spreadsheet according to the invention can contain a set of values, i.e. the set of products associated with ORDCO. This is different from the spreadsheet string value "Subsistence, Ammunition, Fuel". That string could be typed into a conventional mathematical spreadsheet but it would not be recognized as three separate values. It would be recognized only as a single alphanumeric string.

Tables 1 and 2 illustrate how row and column names have semantic value and how they can be used to reference the contents of a cell.

TABLE 2

| Supplier | Product |
|---|---|
| ORDCO | Subsistence, Ammunition, Fuel |
| RORPR | Ammunition 3Party.Product |
| 3Party | Subsistence |

If, according to this example, 3Party is acquired by RORPR, now RORPR will be able to supply the products of 3Party as well as its own products. A simple way to update this Table is to make reference to a cell using row and column name. The syntax in this simple example is the row name followed by a period followed by the column name.

Taking this example further, assume that the 1-35 Armored Battalion (ARBN) requires specific items and services on a set date to execute an action. Its procurement process is based on the following rules:

1. The ARBN is supported by the 47th Forward Support Brigade (FSB). ARBN will procure only from vendors who are deemed as "preferred" by the FSB; and 2. The FSB deems a vendor to be "preferred" if the vendor is listed as an authorized provider by the Middle Support Brigade (MSB).

Currently, two vendors ORDCO and RORPR are listed as providers by the MSB. The above two rules and two facts determine the set of preferred vendors for the ARBN and the list of authorized providers.

TABLE 3

|  | PREF | PROVIDER |
|---|---|---|
| ARBN | FSB.PREF |  |
| FSB | MSB.PROVIDER |  |
| MSB |  | RORPR, ORDCO |

Table 3 illustrates these two rules and the facts that two vendors ORDCO and RORPR are listed as authorized providers by the MSB. The first rule is illustrated in the cell ARBN.PREF which references the cell FBS.PREF. This tells the program that the answer to the ARBN.PREF question can be found in the cell FBS.PREF. The second rule is illustrated in the cell FSB.PREF which references the cell MSB.PROVIDER. This tells the program that the answer to the FSB.PREF question can be found in the MSB.PROVIDER cell which contains the facts that answer the original question ARBN.PREF. Thus, by following the rules, a conclusion can be made based on the facts to which the rules lead. That conclusion is that ARBN can procure from RORPR and ORDCO only.

Unlike mathematical spreadsheets and prior art deductive spreadsheets, the present invention provides that a single cell can contain a set of values and cell references correspond to expressions that evaluate to the cell containing the correct set.

In Table 3, the expressions FSB.PREF, MSB.PROVIDER are called intensions and their values, called extensions, are shown in Table 4 below.

TABLE 4

|  | PREF | PROVIDER |
|---|---|---|
| ARBN | RORPR, ORDCO |  |
| FSB | RORPR, ORDCO |  |
| MSB |  | RORPR, ORDCO |

Table 4 may be said to be a "materialized view" of the effect of the rules shown in Table 3. Here the rules are replaced by the facts to which they ultimately lead. This is similar to a mathematical spreadsheet displaying the calculated value of a formula.

Another way of viewing rules and facts is with the following Prolog clauses which uses the syntax sheet(sheet name, row name, column name, cell contents):

sheet(vendor, 'ARBN', 'PREF', X):-sheet(vendor, TSB', 'PREF', X).

sheet(vendor, 'FSB', 'PREF', X):-sheet(vendor, 'MSB', 'PROVIDER', X).

sheet(vendor, 'MSB', 'PROVIDER', 'RORPR').

sheet(vendor, 'MSB', 'PROVIDER', 'ORDCO').

According to an aspect of the invention, information from several tables (spreadsheets) can be combined to generate new views of facts. Continuing with the present example, Table 5 illustrates the quantities and delivery dates for different products from different suppliers.

TABLE 5

| Supplier | Product | Day | Quantity |
|---|---|---|---|
| ORDCO | Subsistence | Day1 | 10 |
| ORDCO | Ammunition | Day2 | 10 |
| ORDCO | Fuel | Day1 | 20 |
| ORDCO | Fuel | Day2 | 100 |
| RORPR | Ammunition | Day1 | 100 |
| RORPR | Ammunition | Day2 | 20 |
| 3Party | Subsistence | Day2 | 40 |
| 3Party | Subsistence | Day3 | 50 |

Table 5 can be transformed using an expression such as "SupplierTable<supplier, product, day&quantity>" to define the spreadsheet symbolized by Table 6. The syntax of the expression is tablename<row, column, contents>.

TABLE 6

|  | Subsistence | Ammunition | Fuel |
|---|---|---|---|
| ORDCO | (Day1, 10) | (Day2, 10) | (Day1, 20) (Day2, 100) |
| RORPR |  | (Day1, 100) (Day2, 20) |  |
| 3PARTY | (Day2, 40) (Day3, 50) |  |  |

It can be seen that the rows of Table 6 are taken from the values appearing in the column named "supplier" in Table 5 and that the columns of Table 6 are taken from the values appearing column named "product" in Table 5. In addition, the contents of the cells defined by the supplier.product tuple in Table 6 are the day and quantity values associated with each supplier, product pair in Table 5.

Table 6 can be further transformed using the expression availability<day, product, supplier&quantity> which produces Table 7 below.

TABLE 7

|  | Subsistence | Ammunition | Fuel |
|---|---|---|---|
| Day1 | (ORDCO, 10) | (RORPR, 100) | (ORDCO, 20) |
| Day2 | (ORDCO, 10) (3PARTY, 40) | (ORDCO, 10) (RORPR, 20) | (ORDCO, 100) |
| Day3 | (3PARTY, 50) |  |  |

It can be appreciated that Table 7 provides the same information as Table 5 but in a much more useful format. This illustrates an important aspect of logical deduction that if all of the facts and rules are known, true information can be presented in many different useful ways.

Before turning to the figures, it is helpful to first explain an exemplary syntax for use with the deductive spreadsheet of the invention. Although the exact syntax described below is not essential to the invention, the syntax described possess several important features. The primary feature is simplicity. It is easy to learn and intuitive to use. The syntax of the invention simplifies the abstraction process by eliminating the need for variables. Users can program by example (e.g. by specifying an expression in a specific cell) and then generalize the program (e.g. by filling cells with expression from another cell). Thus, users never deal directly with the notion of variables.

A deductive spreadsheet contains a grid of cells, each of which contains a set of elements. Thus, spreadsheets, cells, and elements are currently the three classes of entities that are defined and manipulated by the exemplary language. Operators are classified based on the entities they produce.

An element can be an atomic value (string, integer, etc.) or it can be formed using one of four element operators: tuple construction, tuple projection, arithmetic, and aggregation. The expression (e1, e2, ..., en) constructs a tuple containing e1, e2, ..., en as the components. The tuple construction operation is associative: i.e., ((e1, e2), e3)=(e1, (e2, e3))=(e1, e2, e3). The expression e[k1, ..., kn] where k1, k2, ..., kn are all integers between 1 and n specifies a tuple of tuples (ek1, ek2, ..., ekn). Elements can also be generated using common arithmetic operators over numerical data. An expression of the form AGGREG(ce) evaluates to an element where AGGREG is an aggregation operation (such as SUM, MIN, MAX, etc.) and ce is a cell expression. The tuple construction and projection operations offer a way to create and access data structures. An expression of the form IF(c, e_1, e_2) evaluates to e_1 if condition c is true and e_2 otherwise. The conditions are Boolean expressions defined using the usual set of numeric comparison operators as well as set operators. The underscore indicates set membership (e.g. e_e' means that e is an element of the set e').

Cell expressions evaluate to sets of elements. The contents of a cell may be specified by explicitly listing a set of elements, and/or by expressions constructed using one or more of the following cell operators: cell reference, lifted operators, selection and set operators, and the inverse operator. Cell reference is a row and column reference which can be expressed either as "r.c" or "c r". When the cell is in a different sheet, the syntax is "s!(r.c)" or "s!(c r)". The element operators can all be "lifted" to sets. For example, when e, e1 and e2 represent sets, (e1, e2) represents the cross product of the two sets; e[l] projects a set of tuples e onto the list of components l; and so on. The expression SELECT(c, e) selects those elements of e that satisfy the condition Boolean c. Set union and intersection operators are "|" and "&" respectively. Set difference is expressed as e1\e2 and represents the set of elements in e1 not in e2. The inverse operator is ~. The expression ~R c where R stands for row name and c is an atomic value in a cell, will retrieve all column names that have cells containing c as one of their elements. R could also denote a column name and in that case row names are returned.

When negative or aggregate operators are involved meaning is given in terms of "perfect models" as that term is defined by Teodor C. Przymusinski in "Perfect Model Semantics" which appeared in the International Conference on Logic Programming 1988.

A sheet operator is explicitly written out giving the sheet name, rows, columns, and contents of cells as was described above with reference to Tables 5-7.

The invention also includes what may be called an "abstraction operator". This allows a user to specify an operation in a concrete setting and then copy that operation over to different but similar settings. This operates in a manner similar to the "fill" operations of a mathematical spreadsheet. According to the implemented embodiment, the commands Ctrl-Shift-C and Ctrl-Shift-V to copy an operation from one cell and paste it to one or more cells. When pasted, the operation is altered to refer to elements, cells, and sheets which may be different but similar to the copied cell contents.

Figure 1:
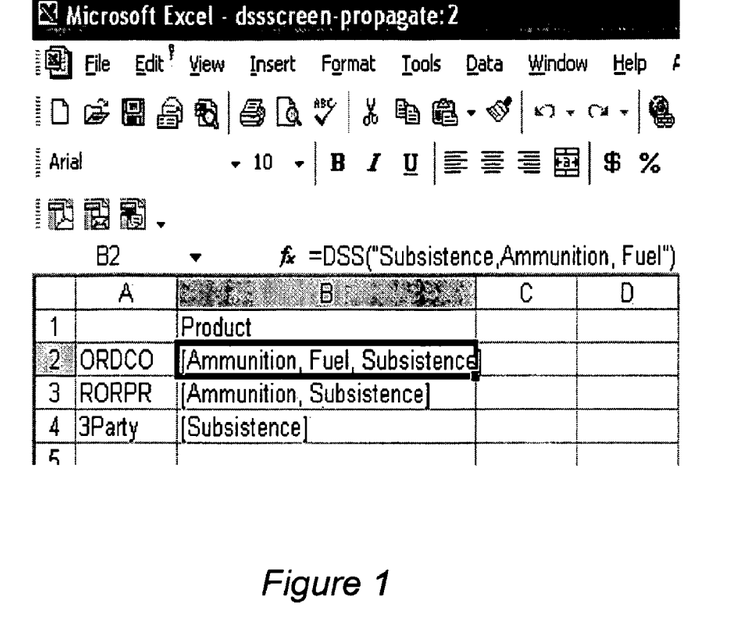
FIGS. 1 and 2 illustrate how data is entered directly and by reference to a cell.
Figure 2:
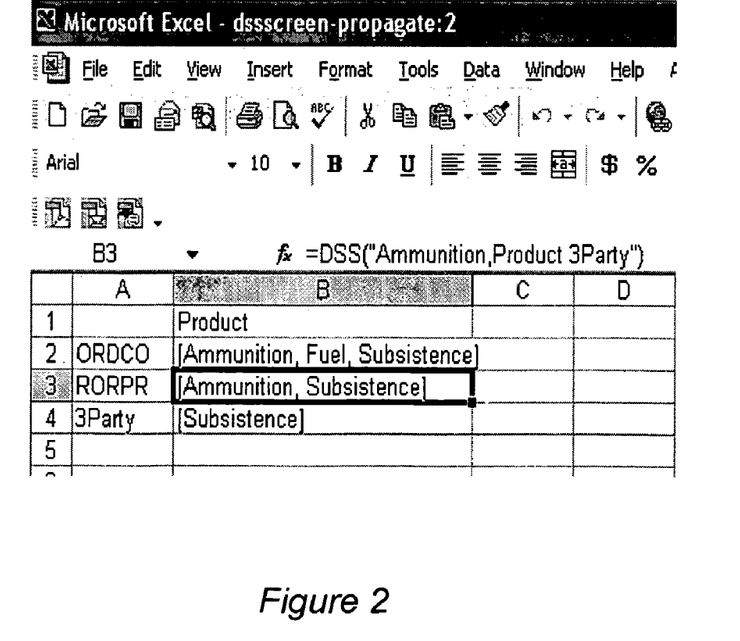

FIGS. 1 and 2 illustrate how Table 2 is encoded into a deductive spreadsheet according to the invention. Column A is not labeled and is used to specify row names ORDCO. RORPR, and 3Party. Row 1 is not labeled and is used to specify the column names following column A, i.e. Product. The contents of column B row 2 can be entered in either of two ways, either by entering the "=DSS( )" function or by typing in [and] before and after the entry. In either case the entry appears in the formula window as a =DSS function and in the cell itself as facts contained in square brackets. Note also that in the example of FIG. 1, the contents of cell ORDCO.Product (B2) were entered as "Subsistence, Ammunition, Fuel" but appear in the cell in alphabetical order. This feature is part of the invention and allows for rapid recognition and elimination of duplicates.

Figure 3:
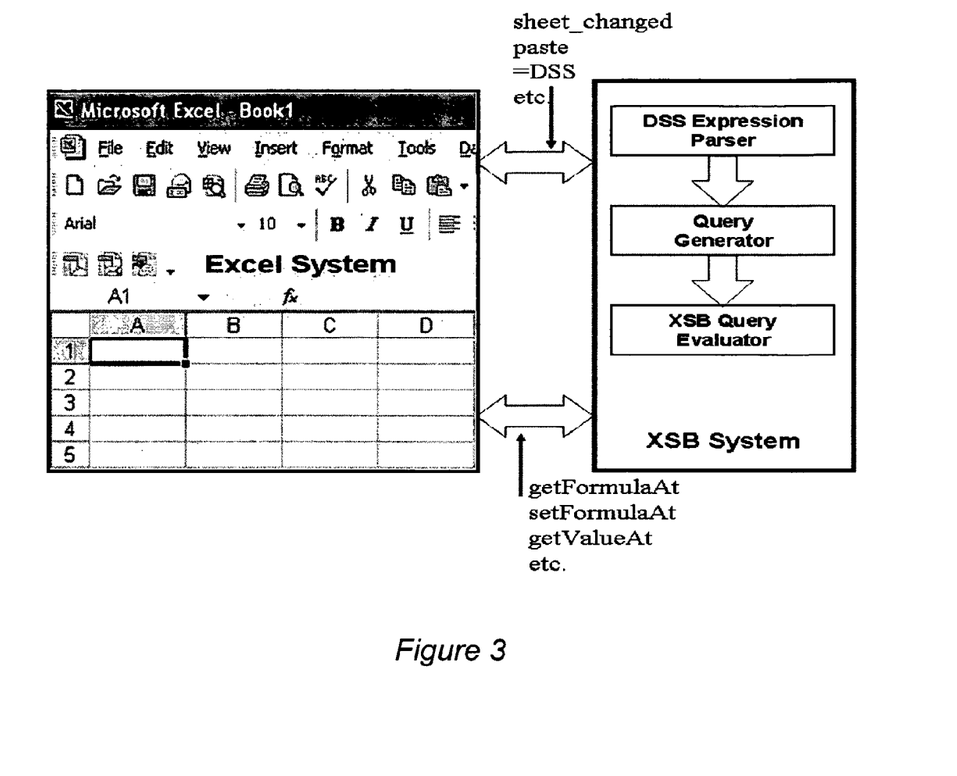

FIG. 3 illustrates in a very high level manner how the invention functions in conjunction with a spreadsheet program such as Microsoft Excel that supports add-ins. This implementation of the invention includes logic processing system that is labeled in FIG. 3 as "XSB System" as well as some glue code that is symbolized by the two arrows that connect XSB System with Excel System. The included CDROM Appendix contains a functional example of XSB System written in Prolog as well as the glue code written in C. Generally speaking, when a "=DSS( )" or "[ ]" expression is encountered by Excel System, it is passed to XSB System as indicated by the upper arrow in FIG. 3 which is labeled "sheet_changed, paste, =DSS, etc." XSB System parses the expression with DSS Expression Parser, generates a Prolog query with Query Generator, and evaluates the query with XSB Query Evaluator. As needed, facts and rules are exchanged between XSB System and Excel System as indicated by the lower arrow in FIG. 3 labeled "getFormulaAt, setFormulaAt, getValueAt, etc."

Figure 4:
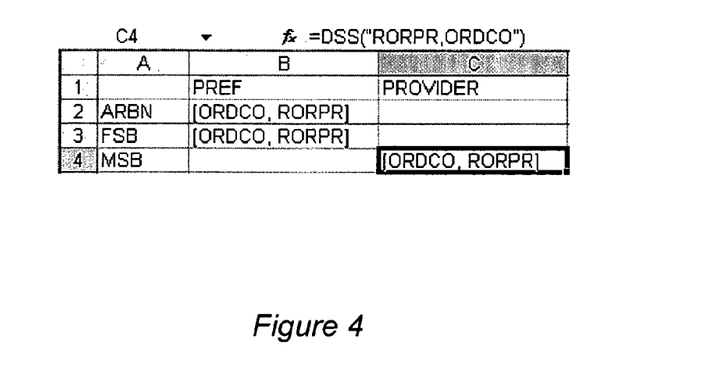
FIGS. 4-6 illustrate how a rule table is encoded into a spreadsheet according to the invention.
Figure 5:
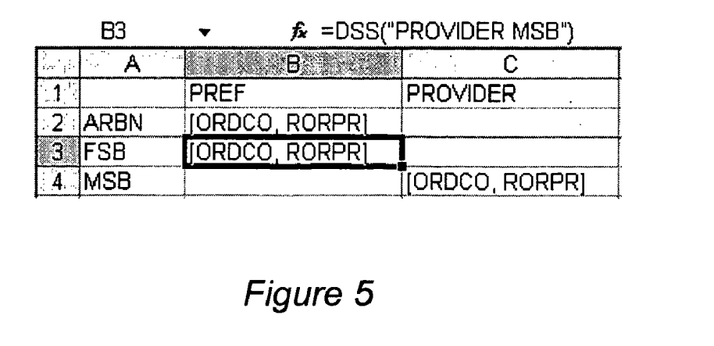
Figure 6:
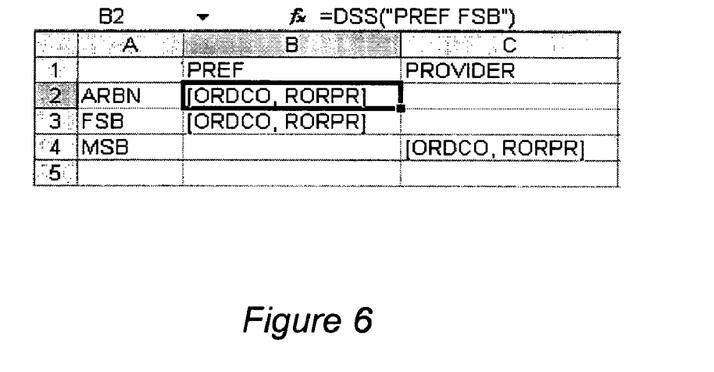

FIGS. 4-6 illustrate the encoding of previously described Table 4 into the deductive spreadsheet of FIG. 3. Referring first to FIG. 4, it can be seen that the row and column labels have been inserted as text in column A and row 1 respectively. The fact that providers ORDCO and RORPR are listed as authorized providers by MSB is entered in cell C4 which is known to XSB System as cell MSB.PROVIDER. FIG. 5 illustrates the rule that FSB deems a provider to be preferred if it is an authorized provider of MSB. Note that the equation line at the top of the sheet shows the rule "=DSS("PROVIDER MSB")" but the cell contents show the result of applying the rule. FIG. 6 shows the same with regard to the rule in cell ARBN.PREF.

Referring still to FIGS. 4-6, more particularly, when the user enters the two facts in cell C4 using the expression "[ORDCO, RORPR]", it is recognized as an XSB System expression and it is passed to the XSB System. XSB System parses the DSS expression and creates two facts corresponding to the two facts entered. XSB System calls back to Excel System instructing it to change the cell expression to =DSS ("RORPR,ORDCO"). It may also instruct Excel System that the values of other cells may have changed and therefore must be recalculated. After XSB System returns control to Excel System, since the cell has changed, Excel System begins its re-evaluation, recognizes that it is a DSS expression, passes control to XSB System which in turn evaluates the expression and returns "ORDCO" and "RORPR" as the two answers. These are displayed in the cell by Excel System:

Continuing along, the DSS expressions entered by the user in cells row 3, column B (FIG. 5) and row 2, column B (FIG. 6) get parsed and translated into Prolog rules and get evaluated to the values shown in those two cells, namely, ORDCO and RORPR. The above sequence of steps illustrates how DSS expressions are compiled into Prolog rules and evaluated in real-time.

Figure 7:
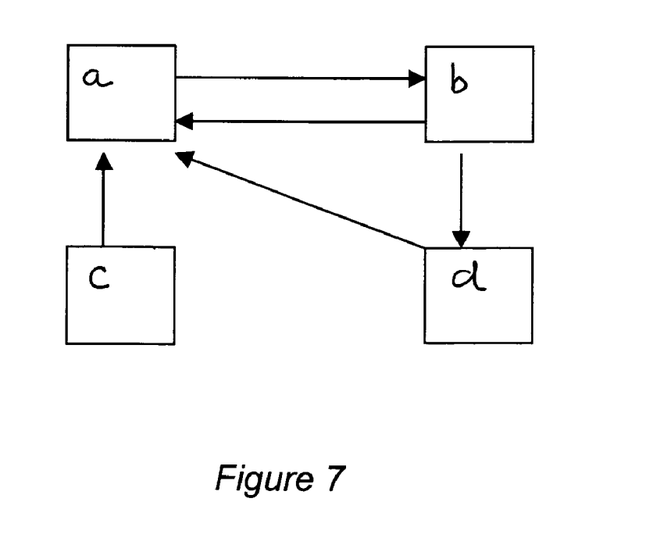
FIGS. 7-9 illustrate how a recursive computation is performed.
Figure 8:
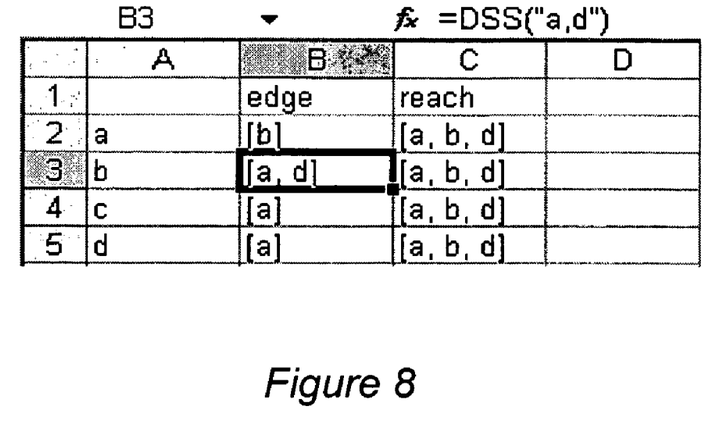
Figure 9:
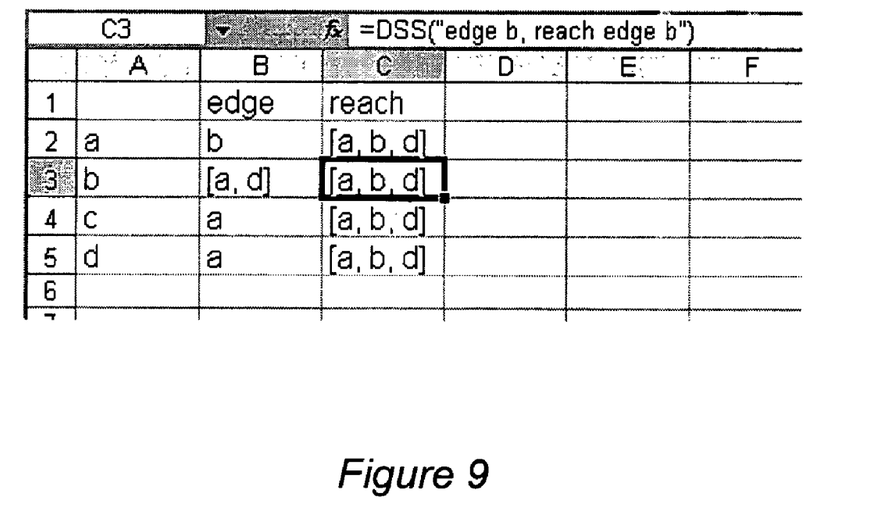

FIGS. 7-9 illustrate how recursive functions are treated by the invention. FIG. 7 is a directed graph showing four nodes a, b, c, and d with arrows connecting some nodes with other nodes. The arrows indicate possible movement between nodes. For example movement from node d is only possible to node a, but movement from node b is possible to node a or node d. The problem of this example is to determine the set of reachable nodes from every node in this graph. FIG. 8 depicts a fragment of its encoding. The rows are labeled for the nodes and the columns are labeled "edge" and "reach". Edge refers to nodes that can be directly reached and reach refers to nodes which can be reached through intermediate nodes.

In FIG. 8 the DSS expression =DSS("a,d") is associated with the highlighted cell in row b and column edge. This expression indicates that nodes a and d are targets of edges from node b. The DSS expression shown in FIG. 9 is associated with the reach cell in row b. The cell expression =DSS ("edge b, reach edge b") indicates that there are two ways to get an entry in this highlighted cell: "edge b" indicates that every entry in the cell at column edge and row b must be in this cell; "reach edge b" indicates that XSB System will take each entry in the cell at column reach and row b (a node reachable from b), and use that value as the row indicator in column edge, and add the entries in that cell to the current cell (i.e. those reachable by taking one more edge). This is an example of a cyclic specification or circular reference: the reach column of row b contains a cell expression that refers to itself.

This DSS expression gets translated to the following left-recursive Datalog rules:

graph(b, 'reach', X):-graph(b, 'edge', X).
graph(b, 'reach', X):-graph(b, 'reach',Y), graph(Y, 'edge', X).

The XSB System evaluates the recursive rules and passes the computed result, which in this case is the set {a, b, d} of reachable nodes, to Excel System for display at that cell. Note that traditional Prolog systems will go into an infinite loop with this example. Those skilled in the art will appreciate that Datalog is a subset of Prolog which enables recursion in a deductive database. It has been applied in XSB System so that multiple values in a deductive spreadsheet cell can be operated on recursively as illustrated above. According to one aspect of the invention in the case of a circular reference, if no negative or aggregate operators are involved, meaning is given in terms of least fixed points. In the presence of negative or aggregate operators, meaning is given in terms of perfect models The next example is a complex supply chain problem. The supply chain of a manufacturer is a complex network of suppliers, retailers, distributors, transporters and storage facilities that participate in the sale, delivery and production of finished goods. Analysis of the behavior of the supply chain provides important information to the manufacturer for contingency planning, resource optimization, etc. Such an analysis can be facilitated by specifying the rules governing the supply chain parameters and relationships in the deductive spreadsheet of the invention as illustrated in the following example.

Figure 10:
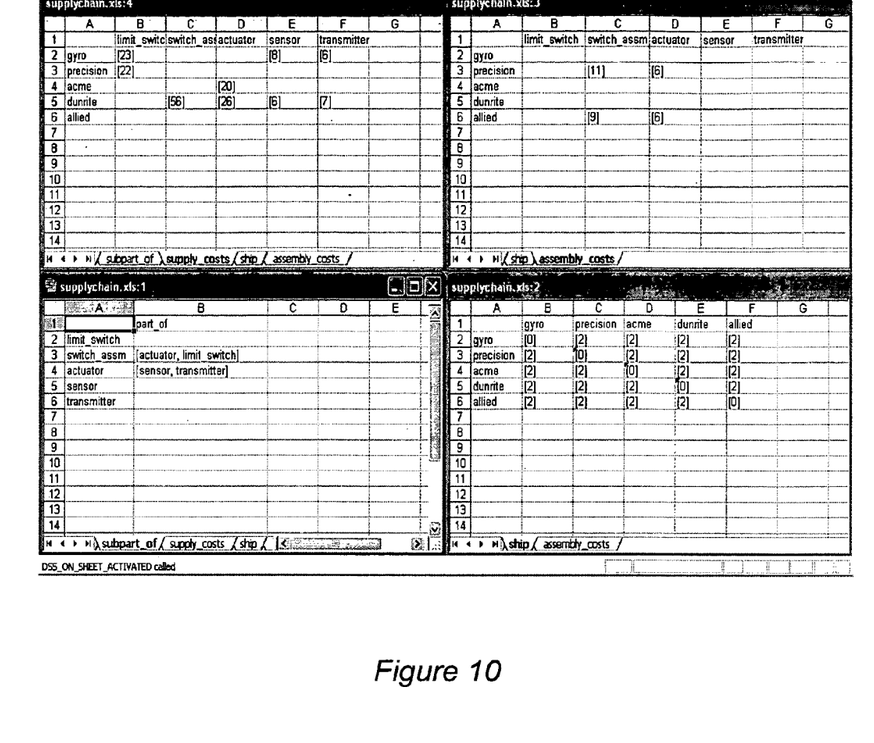
FIGS. 10-18 illustrate how four related spreadsheets according to the invention work together to solve a complex supply chain problem.

A switch assembly consists of two major components: a limit switch and an actuator subassembly; the actuator in turn is made up of a sensor and a transmitter. Each part can either be bought off the shelf or, if a composite part, can be acquired by assembling it from its components. FIG. 10 shows four sheets that contain data about: the cost of buying a part off the shelf from different vendors (the "supply_costs" sheet); the cost of assembling a part (given its components) at different manufacturing sites ("assembly_costs" sheet); the cost of shipping a part from one site to another ("ship" sheet); and the composition of a part ("subpart_of" sheet).

As seen in FIG. 10, sheet "supply_costs" indicates that the switch assembly can be purchased completely assembled from dunrite for $56. Alternatively parts of the switch can be purchased from gyro, precision, acme or dunrite and shipped to an assembler. The sheet "assembly_costs" indicates that, once provided with the parts, precision can assemble the entire switch assembly for $11 or just the actuator for $6. Allied can assemble the entire switch assembly for $9 or just the actuator for $6. The sheet "ship" indicates the cost of shipping a part from one supplier to another for assembly.

The purchase policy is to acquire a part from the least expensive source: either off-the-shelf, or by custom assembly. In order to compute the lowest cost, a new sheet is created (the "acquire" sheet shown in FIG. 11) with the different vendors and assemblers as rows, and the parts as columns. The value of a cell r.c in this sheet gives the best price and the name of a supplier that provides a part at that price. That is, the sheet displays a pair (v,p), where p is the price r has to pay to acquire the part c from vendor v.

Figure 11:
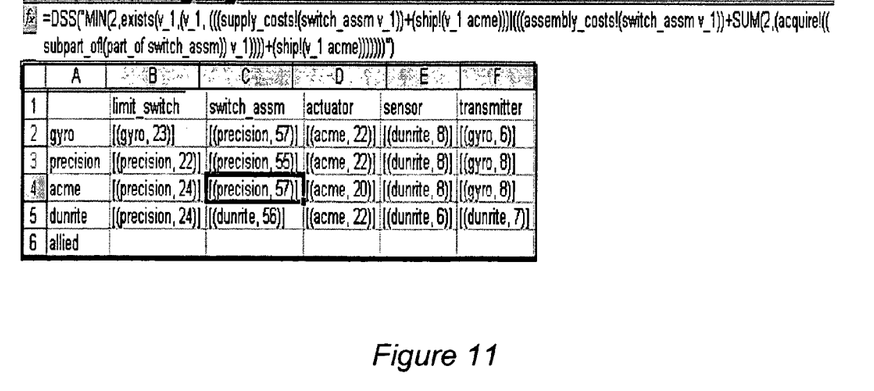

While the four sheets in FIG. 10 are relatively simple statements of fact, the sheet of FIG. 11 is relatively complex with cells having long expressions with multiple operations. For example, cell C4 determines the lowest price acme must pay to acquire a switch assembly and what supplier will sell it at the lowest price. If acme ships an actuator to precision it costs $20 plus $2 shipping (subtotal $22) and precision supplies the limit switch for $22 with no shipping charges, the pre-assembly total would be $44. Add in precision's $11 assembly charge and $2 shipping back to acme and the total is $57. Of course, this conclusion is only produced after examining all of the other ways in which acme could acquire the switch assembly. Thus, before the sheet in FIG. 11 can be built, other intermediate sheets need to be built first.

Figure 12:
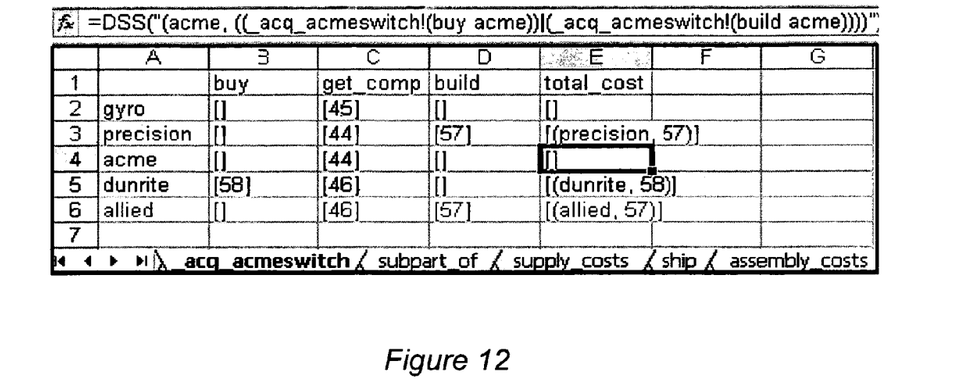

FIG. 12 illustrates an intermediate sheet ("_acq_acmeswitch") which examines the different ways in which acme can acquire a switch assembly. The rows in this sheet represent all the possible sources, and the columns correspond to different kinds of costs. The cells in row gyro in this intermediate sheet represent the following: the cell at column buy represents the cost of purchasing the switch assembly off-the-shelf from gyro (in this case the cell is empty since gyro doesn't sell switch assemblies). The cell at column get_comp represents the cost of acquiring and sending the components of the switch assembly to gyro. The cell at build adds the cost of assembly to the cost of acquiring the components (again here this is empty because gyro doesn't assemble switch assemblies). Finally, the cell at total_cost represents all the costs for Acme to get the switch assembly from gyro. Cells in this column are blank unless values are present in both columns get_comp and build or in column buy. In building this sheet, after the labels are entered in column A and row 1, expressions are entered in the cells of row 1 following the label gyro. For example in the cell gyro.buy, the following expression is entered:

=DSS("((supply_costs!(switch_assm gyro))+(ship!(gyro acme)))").

This expression calculates the price at which gyro sells the part (i.e., the content of gyro.switch_assm in the "supply_costs" sheet) added to the cost of shipping from gyro to acme (i.e., the content of gyro.acme in the "ship" sheet).

The expression for the lowest cost gyro would pay to acquire the components of the switch assembly to be entered in column get_comp and row gyro is:

=DSS("SUM(2,(acquire!((subpart_of!(part_of switch_assm))gyro)))").

Figure 13:
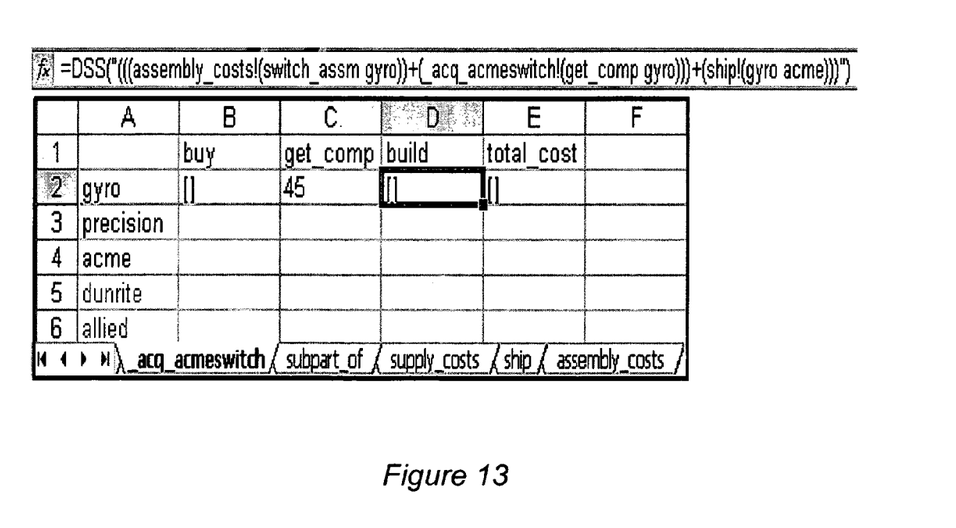

The cost is found by summing over the set of costs for acquiring each component. Note that the acquisition costs themselves will be in the "acquire" sheet shown in FIG. 11 which has not yet been created. Also note that the expression acquire!gyro.(subpart_of!switch_assm.part_of), which appears in the cell gyro.get_comp in FIG. 13, represents the collection of these acquisition costs. Summing over this collection yields the total cost of acquiring the components.

The build column adds assembly costs to the get_comp column. To specify this cost the user enters the following expression in the build column of row gyro:

=DSS("(((assembly_costs!(switch_assm gyro))+(_acq_acmeswitch!(get_comp gyro)))+(ship!(gyro acme)))").

The total_cost column is the union of the corresponding entries in the buy and build columns. To specify total cost the user enters this expression in the column total_cost and row gyro:

=DSS("(gyro,((_acq_acmeswitch!(buy gyro))|_acq_acmeswitch!(build gyro))))").

Figure 14:
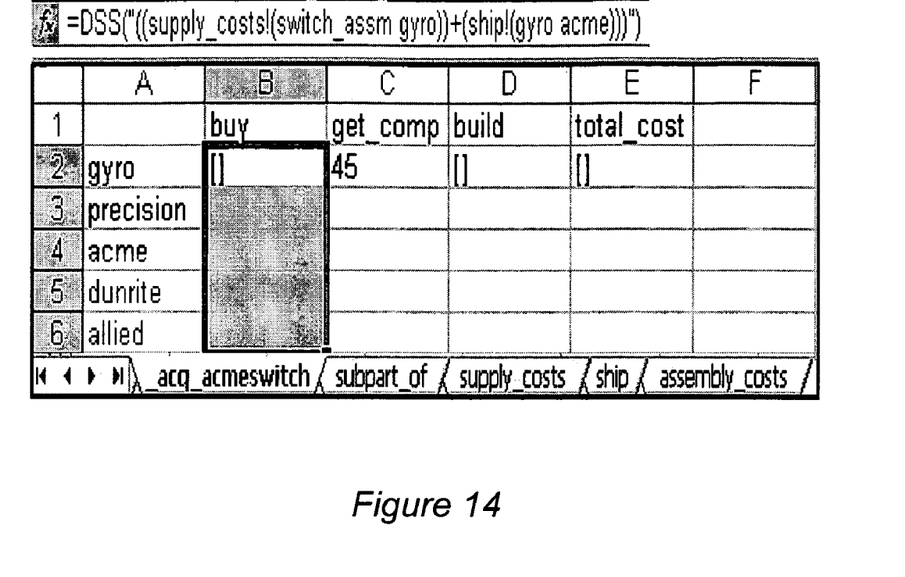

When all of these expressions have been entered the sheet looks like it is depicted in FIG. 13. Now the user can use the fill command to smart copy these expressions into the remainder of the sheet. When filling in the remainder of the rows in the buy column, for every row R, the value of R.buy is buy!R.switch_assm+ship!R.Acme. So this "rule" is coded in XSB System by filling all the cells in the buy column with the cell expression that was originally entered for gyro.buy, substituting R for gyro. The filling is done by the user using XSB System copy/paste operation (Ctrl-Shift-C/Ctrl-Shift-V). FIG. 14 shows the sheet prior to the paste command but after the copy command. The effect of filling is that the references to gyro are replaced with the corresponding row name, similar to the fill command in mathematical spreadsheets.

Figure 15:
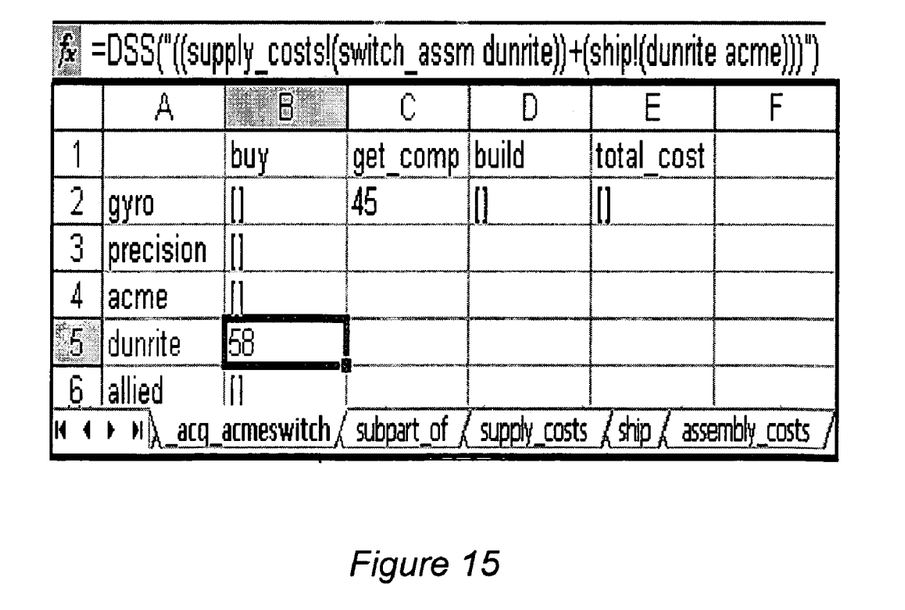

FIG. 15 shows the column after the paste command. Compare the expression from the dunrite.buy cell shown in the formula line of FIG. 15 with the expression in the gyro.buy cell shown in the formula line of FIG. 14. They are the same except for instances of gyro were replaced with dunrite. A noteworthy point here is that although a separate fill operation was shown for each column, the system could have done a DSS copy operation of the entire gyro row followed by a DSS paste over all the rows in the sheet as well. This will be illustrated below with reference to FIG. 18.

Figure 16:
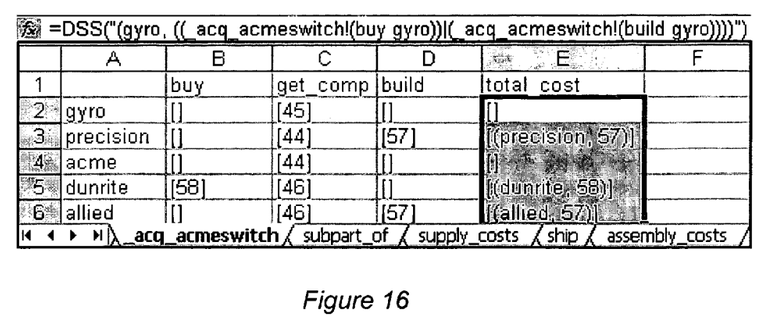

The other columns are filled with the same copy and paste commands filling the entire get_comp, build and total_cost columns of the intermediate sheet as shown in FIG. 16.

Figure 17:
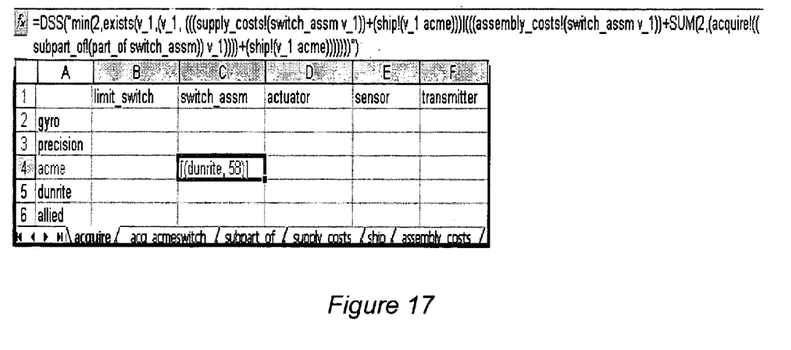

FIG. 17 shows the next step in building the acquire sheet shown in FIG. 11. The intermediate sheet_acq_acmeswitch completed in FIG. 16 can now be used to build the expression in the cell acme.switch_assm in the sheet acquire. First the total cost column in_acq_acmeswitch is copied as shown in FIG. 16. Then it is pasted into the cell acme.switch_assm in the sheet acquire as shown in FIG. 17. In FIG. 17, the expressions from column E of FIG. 16 are extrapolated to the contents of the cells referenced. For example, the expression in the formula line of FIG. 16 references a row and column in the sheet of FIG. 14, i.e. "_acq_acmeswitch!(buy gyro)". This refers to the sheet "_acq_acmeswitch" which is the subject of FIG. 14. The contents of the cell "_acq_acmeswitch!(buy gyro)" are "=DSS("((supply_costs!(switch_assm gyro))+ (ship!(gyro acme)))")". It will be appreciated that a rule similar to that has been generated in FIG. 17 except that the row identifier. "gyro" has been replaced by the variable "v1". This new rule which was generated by XSB System generalizes the rule for determining the cost of obtaining a switch assembly from each of the suppliers and, as seen at the start of the =DSS statement, finds the minimum. More particularly, after the column is pasted into the cell, a menu appears giving the user the option to select an aggregation (e.g. SUM, MIN, MAX, etc.) to apply to the pasted rule.

Figure 18:
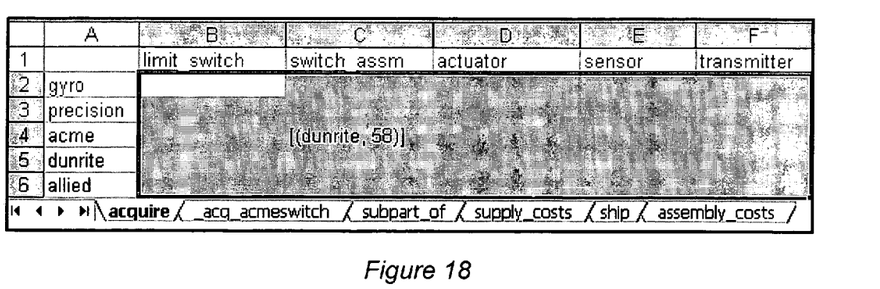

Once a single cell expression has been entered in the sheet acquire as shown in FIG. 17, that cell expression is copied and pasted throughout the sheet as shown in FIG. 18. Those skilled in the art will notice some key features of the encoding process described above with reference to FIGS. 10-18. First, rules were created without using variables. The DSS-copy and DSS-paste gestures are used to abstract "rules" from one instance and to apply them to other instances. In the supply chain example above, the only cells whose intensions were entered explicitly and not by filling (other than the four fact tables shown in FIG. 10) were the four cells in the Gyro row of the "_acq_acmeswitch" table. Thus, complex rule systems can be constructed with relatively simple interactions. In particular, note how complex the illustrated expression is in the sheet acquire (FIG. 10). This and all the expressions for other cells in the sheet acquire were automatically generated by XSB System after the user simply DSS-copied the expression in the cell at acme row and switch_assm column and DSS-pasted it into the other cells in sheet acquire. Even the expression copied was the result of another copy/paste operation. All the user had to enter were the simple values into the sheets in FIG. 10 and the simple expressions for the cells in row gyro in FIG. 13. The more complex expressions were generated via copy/paste gestures.

Second, it should also be noted that cell references can be recursive (unlike mathematical spreadsheets). In this example, the lowest cost of a part is defined in terms of the lowest costs of its subparts. Recursive specifications enable the user to encode dynamic programming solutions. Indeed, the shortest path in a cyclic graph (with non-negative edge weights) can be specified easily with XSB System. Thus, coding is example based and at a high level, specifying only how the different cell values are related. Moreover, numeric and symbolic computations are seamlessly combined.

Finally, it should be noted that the user sees the effect of the specifications directly and immediately; a change in a component's price, for example, will immediately propagate to all the dependent cells (as in a traditional spreadsheet.) This permits the user to experiment with what-if scenarios: e.g. the impact of a supplier ceasing to sell a particular part or changing the price of a part.

As stated above, the invention contemplates inference justification to support logical conclusions. Although not implemented in the exemplary code, this is preferably shown by highlighting cells that immediately lead to the conclusion. Justification shows the user only those parts of the proof search that are relevant to the proof/disproof of the goal. For example, if a query is evaluated to true, the justifier will present the details of a successful computation path, completely ignoring any unsuccessful paths traversed. Similarly, when a query is evaluated to false, it will only show a false literal in each of its computation paths, completely ignoring the true literals.

In a complex model, multiple related spreadsheets which reference each other are created and the invention contemplates different ways to view multiple related sheets. Although, not implemented in the exemplary code, in addition to the familiar tiling of windows, the invention preferably allows two windows to be scrolled together and also preferably allows tables to be overlaid on one another. In overlaying one or more sheets having the same row and column names, cells grow subcells, each showing the contents of the cell of a respective sheet at the particular row and column intersection. Each subcell is also labeled with the name of the sheet it is displaying. Overlay view can be exited by clicking on a subcell and the view will change to a view of the sheet that contains the subcell.

There has been described and illustrated herein a deductive spreadsheet. While particular embodiments of the invention have been described, it is not intended that the invention be limited thereto, as it is intended that the invention be as broad in scope as the art will allow and that the specification be read likewise. Thus, while particular programming languages have been disclosed, it will be appreciated that other programming languages could be used as well. In addition, while a particular syntax has been disclosed, it will be understood than another syntax could be used. Furthermore, while Microsoft Excel has been disclosed as the exemplary spreadsheet interface for the invention, it will be understood that any other spreadsheet program that supports "add-in" programs can be similarly used. It will therefore be appreciated by those skilled in the art that yet other modifications could be made to the provided invention without deviating from its spirit and scope as claimed.

What is claimed is:

1. A user programmable deductive spreadsheet apparatus embodied on a tangible computer readable medium coupled to a processor and a display, comprising:
    a spreadsheet interface presenting a grid of cells on the display, each of which is accessed individually;
    a logic processing system in bidirectional communication with said spreadsheet interface; and
    said logic processing system supporting a syntax which permits a circular definition and providing a solution to said circular definition on the display, wherein when no negative or aggregate operators are used in cell expressions which include the circular definition, meaning of the circular definition is given by said logical processing system on the display in terms of least fixed points, otherwise in terms of perfect models.

2. The apparatus according to claim 1, further comprising:
said logic processing system supporting a syntax which permits a cell to reference itself directly in performing an operation and permits a cell to reference itself indirectly in performing an operation.

3. The apparatus according to claim 2, wherein:
said operation is an operation selected from the group consisting of logical operations, and aggregation operations.

4. The apparatus according to claim 3, further comprising:
said logic processing system supporting a syntax which permits a set of cells to include a circular reference.

5. The apparatus according to claim 1, further comprising:
said logic processing system supporting a syntax which permits the naming of rows and columns with user definable names and the referencing of cells by user definable name such that the contents of a first cell are included in a second cell which references the first cell by user defined row and column name.

6. The apparatus according to claim 5, further comprising:
said logic processing system supporting a syntax which permits operation on cell contents via expressions that reference one or more cells by user defined row and column name.

7. The apparatus according to claim 1, further comprising:
said logic processing system supporting a syntax which permits a set of cells to include a circular reference.

8. The apparatus according to claim 1, further comprising
said logic processing system supporting a syntax which permits the recognition of a tuple in a single cell.

9. The apparatus according to claim 8, further comprising:
said logic processing system supporting a syntax which permits the recognition of an n-ary relation in a single cell.

10. The system according to claim 9, further comprising:
said logic processing system supporting a syntax which permits the derivation of an n-ary relation.

11. The apparatus according to claim 1, further comprising:
said logic processing system supporting a syntax which permits a cell in a first spreadsheet to contain a reference to a cell in another spreadsheet.

12. The apparatus according to claim 1, further comprising:
said logic processing system supporting a syntax which permits defining a spreadsheet as a transformation of another spreadsheet.

13. The apparatus according to claim 1, further comprising:
said logic processing system supporting a syntax which permits defining contents of a cell in terms of a spreadsheet.

14. The apparatus according to claim 1, further comprising:
said logic processing system supporting a syntax which permits copying contents of a row or column into a cell and automatically transforming the contents into a generalized version in the cell.

15. The apparatus according to claim 1, wherein:
said solution includes a non-singleton set of values.

16. A user programmable deductive add-in apparatus embodied on a tangible computer readable medium coupled to a processor and a display for use with a mathematical spreadsheet apparatus having an interface presenting on the display a grid of cells, each of which is accessed individually, the mathematical spreadsheet apparatus supporting an add-in apparatus, said add-in apparatus comprising:
a logic processing system in bidirectional communication with said spreadsheet interface;
said logic processing system supporting a syntax which permits a circular definition and providing a solution to said circular definition on the display, wherein
when no negative or aggregate operators are used in cell expressions which include the circular definition, meaning of the circular definition is given by said logical processing system on the display in terms of least fixed points, otherwise in terms of perfect models.

17. The add-in according to claim 16, further comprising:
said logic processing system supporting a syntax which permits a cell to reference itself either directly or indirectly in performing an operation.

18. The add-in according to claim 16, wherein:
said solution includes a non-singleton set of values.

19. A user programmable deductive add-in apparatus embodied on a tangible computer readable medium coupled to a processor and a display for use with a mathematical spreadsheet apparatus having an interface presenting a grid of cells on the display, each of which is accessed individually, the mathematical spreadsheet apparatus supporting an add-in apparatus, said add-in apparatus comprising:
a logic processing system in bidirectional communication with the spreadsheet interface;
said logic processing system supporting a syntax which permits a set of cells to include a circular reference and providing a solution to said circular reference on the display, wherein
when no negative or aggregate operators are used in cell expressions which include the circular reference, meaning of the circular reference is given by said logic processing system on the display in terms of least fixed points, otherwise in terms of perfect models.

* * * * *